Aug. 14, 1934.  F. J. CURTIS  1,969,966
LIQUID MEASURING DEVICE
Filed May 4, 1929  3 Sheets-Sheet 1
FIG. I
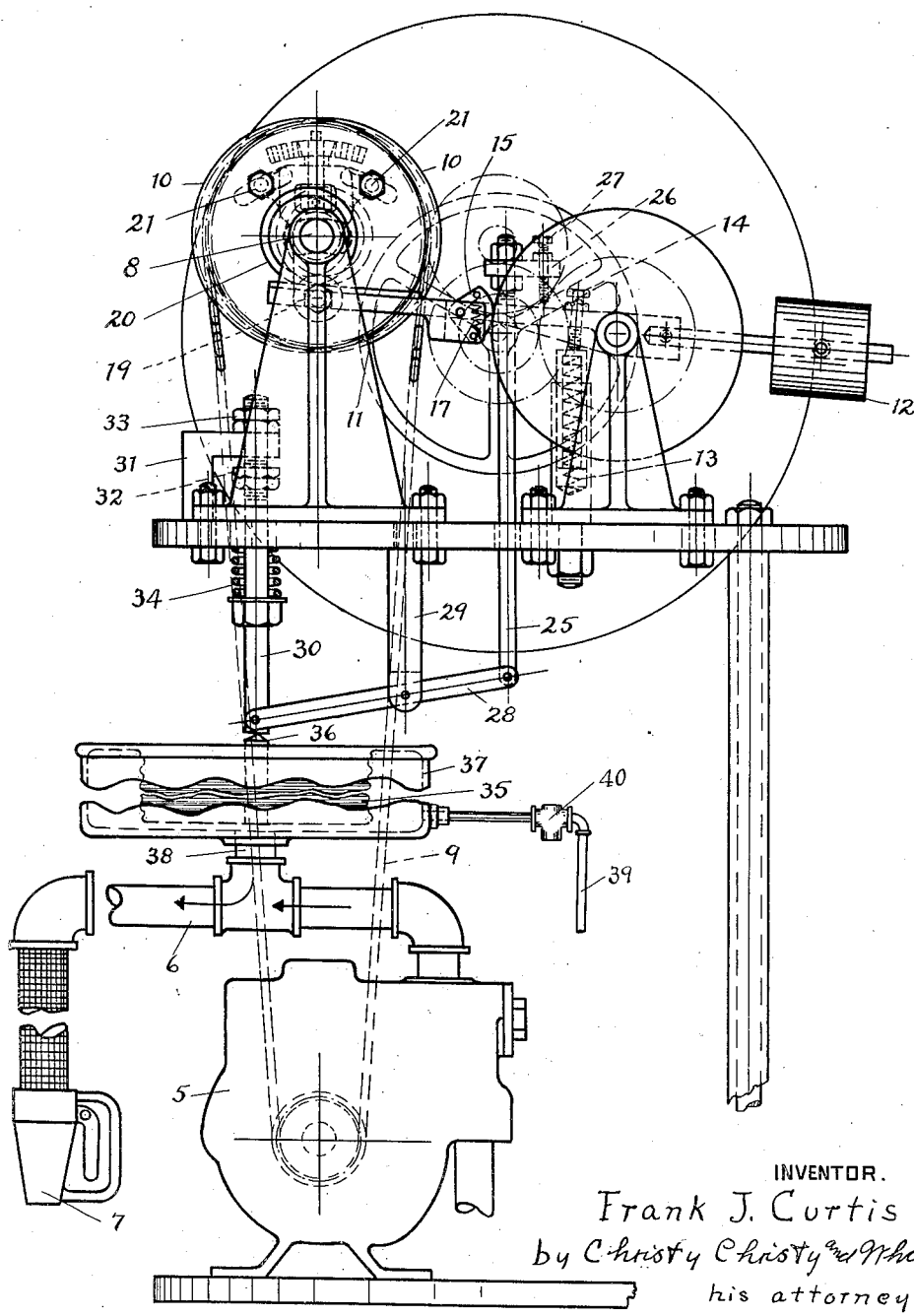
INVENTOR.
Frank J. Curtis
by Christy Christy and Wharton
his attorneys Aug. 14, 1934.         F. J. CURTIS         1,969,966
LIQUID MEASURING DEVICE
Filed May 4, 1929         3 Sheets-Sheet 2
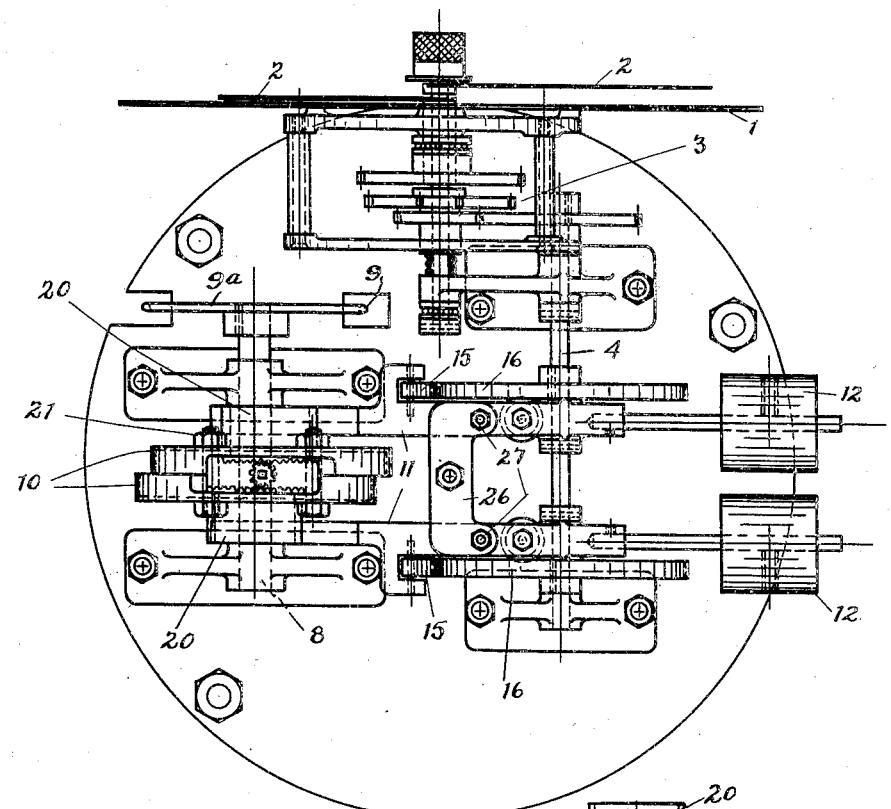
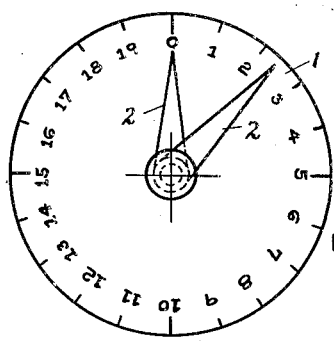
FIG. V
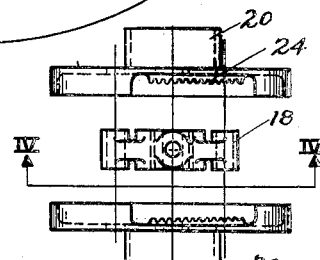
FIG. III
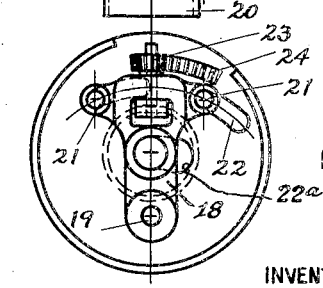
FIG. IV
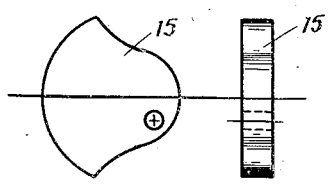
FIG. VI
INVENTOR.
Frank J. Curtis
by Christy Christy and Wharton
his attorneys Aug. 14, 1934.  F. J. CURTIS  1,969,966
LIQUID MEASURING DEVICE
Filed May 4, 1929  3 Sheets-Sheet 3
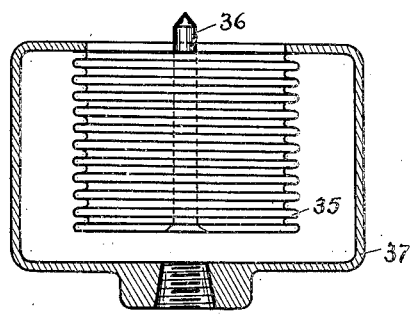
FIG. VIII
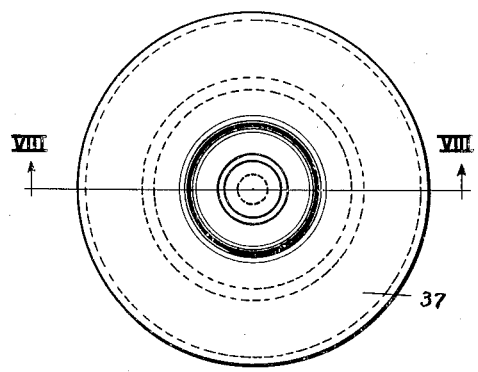
FIG. VII
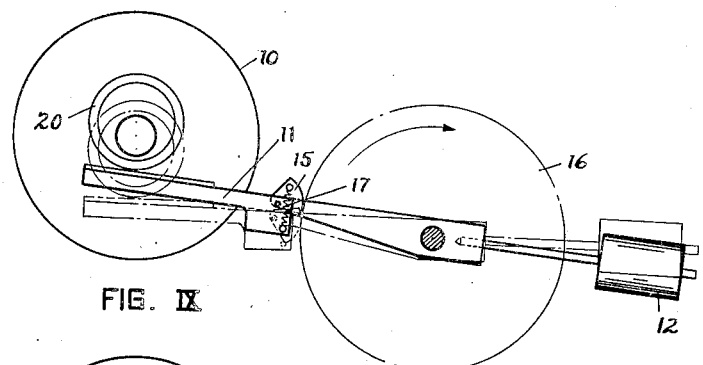
FIG. IX
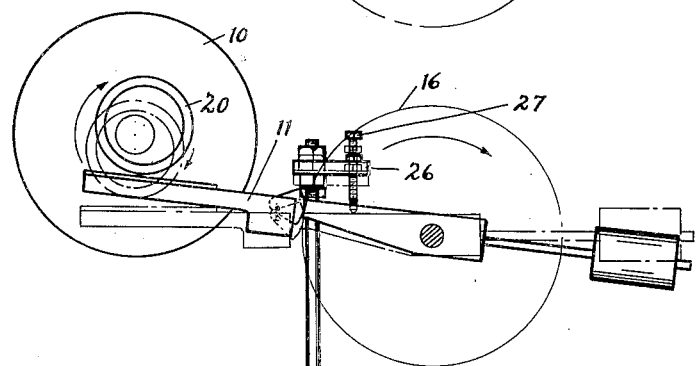
FIG. X
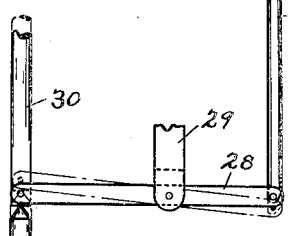
INVENTOR
Frank J. Curtis
by Christy Christy and Wharton
his attorneys Patented Aug. 14, 1934

1,969,966

UNITED STATES PATENT OFFICE 1,969,966

LIQUID MEASURING DEVICE

Frank J. Curtis, Ben Avon, Pa., assignor to Pittsburgh Machine Tool Co., Braddock, Pa., a corporation of New Jersey Application May 4, 1929, Serial No. 360,407

4 Claims. (Cl. 73—167)

This invention relates to a device for measuring the quantity of liquid flowing under pressure.

Measuring the quantity of liquid discharged under pressure, as for example the delivery of gasoline from a receptacle, considerable difficulty has been experienced with every type of metering device heretofore employed. In meters providing a restricted passage for the flow of gasoline, such passage becomes easily obstructed by small particles of any foreign substance present in the liquid. In meters of the oscillating plate type difficulty has been experienced from wedging of the plate in an open position due to the presence of particles of sand or other foreign matter, and to scoring of the valve disk or seat after continued use. In either case liquid may pass through the metering valve seat without so moving the oscillating part of the valve as to indicate correctly the flow of liquid therethrough.

The object of the present invention is to provide a positive and sensitive measuring device for liquids in which the metering means are actuated in accordance with the flow of liquid without utilizing any form of metering valve through which the liquid itself passes.

Another object of the invention is to provide a measuring device which may be readily calibrated initially for accurate measurement of liquids delivered, and which may be readily recalibrated to compensate for any inaccuracies produced by wear, fatigue, or displacement of the parts due to continued use of the device.

In the accompanying drawings Figure I is a rear elevation of the liquid measuring device of the present invention; Figure II is a plan view thereof; Figure III is an edge view of the eccentric constituting an element of the motion transmitting assembly of the device; Figure IV is an elevation of portions of the eccentric looking from the position of the line IV—IV Fig. III; Figure V is a front elevation of the indicating dial of the device; Figure VI is a detail of the ratchet forming a portion of the motion transmitting assembly of the device, showing such ratchet both in elevation and in edge view; Figure VII is a plan view of the element of the device which is directly acted upon by variations in pressure of the fluid for controlling the transmission of movement to the indicating means of the device; Figure VIII is a vertical sectional view of such element, taken on the line VIII—VIII of Fig. VII; Figure IX is a fragmentary elevation of a portion of the motion transmitting means of the device, illustrating the action of the parts in imparting an impulse for producing movement of the indicating means; and Figure X is a similar view, showing a portion of the controlling means of the device, and illustrating the action of the parts in imparting an impulse of different degree from that shown in Fig. IX for producing movement of the indicating means.

The indicating dial 1 of the device is provided with one or more indicating pointers 2, which are directly actuated by means of clock mechanism of usual form designated generally by the reference numeral 3. The clock mechanism 3 is actuated by a shaft 4. The rotation of shaft 4 therefore determines the movement of the pointers 2 to indicate the amount of liquid flowing, and the remaining elements and parts of the device are for the purpose of producing rotation of the shaft 4 in accordance with such flow.

Associated with the measuring device are means for delivering liquid under pressure, such as the centrifugal pump 5, which has a connection with the source of supply, and which is arranged to force fluid under pressure through a conduit 6 and valved delivery nozzle 7.

The device comprises a second shaft 8, which is shown as deriving its movement from the pump 5 by means of flexible connection 9 and pulley 9a. Shaft 8 is thus continuously rotated during operation of the pump, irrespective of the passage of liquid through the valved nozzle 7. Connected with shaft 8 are eccentric disks 10, the detail structure and arrangement of which will be hereinafter explained. Arms 11, loosely mounted for angular movement on shaft 4, are arranged to contact the eccentric disks 10 to be oscillated thereby. Yielding means are arranged to exert a force tending to hold the arms 11 in operative position with relation to the eccentric disks 10. Such yielding means are shown as counterweights 12, and springs 13 contacting an adjusting screw 14 on each arm. Either the counterweight or the spring may be omitted, if so desired. Angular movement of the arms 11, produced by contact with the eccentric disks 10, is transmitted to the dial shaft 4 for rotating the same by means of suitable members, such as the thumb ratchets 15, which are carried by the arms and are in contact with the periphery of wheels 16 fixed to the shaft 4. The thumb ratchets 15, as shown, are pivotally mounted in the arms 11 and are yieldingly pressed against the periphery of the wheels 16 by means of light springs 17.

The eccentric disks 10 are both free on the shaft 8, being operatively connected therewith by an intermediate member 18 which is rigidly fixed to the shaft. Both disks are pivoted on member 18 by means of a bolt or the like 19, which passes through both disks and the member 18 at a point lying without the shaft 8. Each of the disks 10 is provided with a hub 20 for contacting one of the arms 11. This hub is circular, so that the eccentricity of the structure depends upon the adjustment of the cam disks 10 upon their pivoting shaft 19. In order to permit this pivotal movement, the bolts 21, which hold the disks in fixed relation lie in slots 22 in each of the disks. In order to produce the necessary eccentricity to the disks, a pinion 23 is mounted on the central member 18 to mesh with arcuate racks 24 on the disks 10. Each of the disks 10 are further provided with a slot 22a embracing shaft 8.

In order to effect an adjustment of the assembly, pinion 23 is rotated to act on the racks 24, and thereby swing the two disks 10 in opposite directions of rotation on their pivot 19. The extent of this swinging movement, up to the limit provided by the slots 22 and slots 22a, thus determines the eccentric action of the disks; that is, the action of the hubs 20 on the arms 11. When so adjusted the disks are locked in position by means of the locking bolts 21 in the slots 22 of the disks. With the disks so arranged the thumb ratchets 15 have alternately timed movements to act on wheels 16 to produce rotation of the shaft 4, one of the thumb ratchets carried by its arm 11 imparting an impulse to the wheel, while the other is riding freely on downward movement of its arm in preparation for a movement of actuation. By the duplication of these parts, movement of the dial shaft 4, and consequently of the pointers 2 is produced by shorter and more frequent advances than if but one set of transmitting parts were to be employed.

The angular distance through which dial shaft 4 is rotated, assuming uniform rotation of the driving shaft 8, and a certain adjustment of eccentric disks 10, thus depends upon the distance through which the arms 11 follow the throw of the hubs 20 during their rotation. The operative means for permitting actuation, and for automatically regulating the same are, therefore, in the connections between the means for delivering the liquid and the arms 11. Such means comprise a rod 25, which carries a yoke 26 overlying the arms 11, and having adjusting screws 27 arranged to contact the upper surface of the arms to hold the arms out of contact with the hubs 20 of eccentric disks 10, and to limit the distance through which they are permitted to follow the throw of the hubs. Rod 25 is pivoted to a lever arm 28, pivotally mounted in a supporting member 29. The other extremity of arm 28 is pivoted to a movable rod 30, which passes through a bracket 31, and which has thereon adjustable stops 32 and 33 arranged to limit movement of the rod by contact with the bracket. A coil spring 34 exerts a force tending to move rod 30 in a downward direction, with reference to Fig. I of the drawings, and thereby produce upward movement of the stop rod 25. The force exerted by spring 34 is opposed by the force exerted by copper bellows 35, which have thereon a pin 36 arranged to bear against the rod 30. Copper bellows 35 are contained in a casing 37, which has an open connection 38 with conduit 6 and delivery nozzle 7.

In order to further describe the operation of the device it will be assumed that pump 5 is operating, and that therefore the shaft 8 connected with it, and carrying cam disks 10, is continuously rotated. While, therefore, the valve or nozzle 7 remains closed the pressure of the liquid acting upon the copper bellows 35 compresses the same, and overbalances the force of the spring 34. Rod 30 is thus held in its upward position as limited by the contact of stop member 32 with bracket 31, and the contact screws 27 carried by rod 25 are in contact with the upper surfaces of arms 11 to hold them beyond the limit of throw of hubs 20 on eccentric disks 10. The arms 11 are desirably retained a very short distance from the outer limit of throw of the hubs 20, so that the device will act instantaneously to indicate the flow of liquid.

Upon discharge of liquid through the valved nozzle 7 the flow of liquid directly through conduit 6 reduces pump pressure on bellows 35. This expanding movement of the bellows 35 is proportional to the reduction of pressure. With various types of pump it is desirable that the pressure produced thereby be limited. For this purpose a by-pass 39, provided with a suitable automatic by-pass valve 40, is provided. As shown, the by-pass 39 is connected with casing 37 which contains the bellows 35. It may, however, be inserted at any desired point in the connections between the pump and the nozzle. With the by-pass valve 40 set to limit the pressure within the casing 37 to a definite maximum, the bellows 35, and parts associated directly therewith are so selected and regulated that the device becomes operative as a measuring instrument upon reduction of such pressure maximum.

Upon pressure reduction spring 34 is permitted to act to move arm 30 downwardly, raising arm 25, and moving stop screws 27 upwardly. The force exerted by springs 13 and counterweights 12, if both of these elements are used, or of either of them if one be omitted, thus forces the arms into position to be contacted by the hubs 20, this movement being limited to the distance permitted by the raised position of stop screws 27. The hubs 20 thus contacting the arms 11 through some portion of the throw of eccentric disks 10, oscillate the arms to produce rotation of wheels 16 and dial shaft 4 by the action of the thumb ratchets on the wheels.

As previously explained the action of thumb ratchets 15 on wheels 16 is alternate, so that two impulses are produced for each rotation of the shaft 8 which carries the cam disks.

If the valve of nozzle 7 is open to less than its full extent, the stop screws 27 are in such position as to permit the arms 11 to follow the hubs 20 of the cam disks through a portion of their throw only, the movement of the arms being of an according length, and the angular distance through which the wheels 16 and shaft 4 is rotated being in accordance. With increased passage of liquid through the nozzle 7, bellows 35 are permitted to expand further, and spring 34 can thus act to raise stop screws 27 further, permitting the arms 11 to follow the throw of the hubs 20 through a greater portion of each revolution. The angular distance through which the wheels 16 are rotated at each impulse is correspondingly increased. With full nozzle opening, the arms 11 are permitted to follow the entire throw of the hubs 20. This regulation is effected by so determining the movement of rods 30 and 25 and the position of stock screws 27, that the fully expanded position of the bellows 35, and the movement permitted thereby permits the arms to follow the hubs 20, in the position to which they have been adjusted, throughout their entire throw.

The calibration to the volume of liquid delivered by the pump is chiefly effected by the adjustment of cam disks 10 on their pivot 19, it being assumed that with full flow of liquid through the nozzle the arms 11 are maintained in contact with the hubs 20 throughout their entire throw.

What I claim is:

1. In apparatus for delivering liquid and for measuring the volume of the liquid delivered, the combination of means operable upon variations in pressure exerted thereon by the liquid, means for creating a normally constant pressure of liquid on said pressure-operable means, means operable to vary the pressure of the liquid on said pressure-operable means by discharge of the liquid, an indicator, driving means operating continuously during the existence of pressure of liquid in the apparatus, transmitting mechanism comprising a contact member arranged to engage yieldingly said driving means, said transmitting mechanism organized to transmit movement from said driving means to the indicator, and control connections from said pressure-operable means to said transmitting mechanism, said control connections acting with movement of said pressure-operable means under pressure variation caused by delivery of liquid to regulate the engagement of the contact member of the transmitting mechanism with the driving means and thereby control action of said transmitting mechanism and movement of said indicator in substantial accordance with movement of said pressure-operable means.

2. In apparatus for delivering liquid and for measuring the volume of the liquid delivered, the combination of means operable upon variations in pressure exerted thereon by the liquid, means for creating a normally constant pressure of liquid on said pressure-operable means, means operable to vary the pressure of the liquid on said pressure-operable means by delivery of the liquid, an indicator, driving means for said indicator, transmitting mechanism operative between said driving means and said indicator causing the driving means to move said indicator through successive intervals, and means acting between said pressure-operable means and said transmitting mechanism whereby the pressure-operable means acts under the influence of variations in pressure of liquid thereon caused by delivery of the liquid to vary the operative relation between said transmitting mechanism and the driving means and thereby to vary the intervals through which the indicator is moved.

3. In apparatus for delivering liquid and for measuring the volume of liquid delivered, the combination of bellows compressible under pressure exerted thereon by the liquid and expansible under relief of said pressure, means comprising a pump for creating a normally constant pressure of liquid on said bellows, valving means operable to vary the pressure of the liquid on said bellows by delivery of the liquid, an indicator, driving means actuated by said pump and thereby operating continuously during the existence of pressure of liquid in the apparatus, transmitting mechanism comprising a contact member arranged to engage yieldingly said driving means, said transmitting mechanism organized to transmit movement from said driving means to said indicator, and control connections from said bellows to the said transmitting mechanism, said control connections acting with movement of said bellows under pressure variation caused by delivery of liquid to regulate the engagement of the contact member of the transmitting mechanism with the driving means and thereby control action of said transmitting mechanism and movement of said indicator in substantial accordance with movement of said bellows.

4. In apparatus for delivering liquid and for measuring the volume of liquid delivered, the combination of bellows compressible under pressure exerted thereon by the liquid and expansible under relief of said pressure, means comprising a pump for creating a normally constant pressure of liquid on said bellows, valving means operable to vary the pressure of the liquid on said bellows by delivery of the liquid, an indicator, driving means actuated by said pump and thereby operating continuously during the existence of pressure of liquid in the apparatus, transmitting mechanism including a contact element shiftable into and out of operative contact with said driving means, said transmitting mechanism organized to transmit movement from said driving means to said indicator during engagement of said contact element with said driving means and including yielding means exerting a constant force tending to shift the contact element into operative engagement with said driving means, and a lever system between said bellows and said shiftable contact element acting during contracted condition of said bellows under the normally constant pressure of liquid thereon to hold said shiftable contact element out of contact with the driving means and acting under expansion of said bellows attendant upon reduction in the pressure of liquid on the bellows caused by delivery of liquid to release said shiftable contact element to the force exerted by said yielding means for shifting said contact element into operative engagement with said driving means, to thereby cause transmission of movement from said driving means to said indicator.

FRANK J. CURTIS.